(12) United States Patent
McNae

(10) Patent No.: US 10,724,731 B2
(45) Date of Patent: Jul. 28, 2020

(54) LIGHTED GAMING FURNITURE SYSTEM, LIGHTED GAMING CHAIR AND LIGHTED GAMING DESK

(71) Applicant: Ace Bayou Corporation, Wayzata, MN (US)

(72) Inventor: Robert McNae, Wayzata, MN (US)

(73) Assignee: Ace Bayou Corporation, New Orleans, LA (US)

( * ) Notice: Subject to any disclaimer, the term of this patent is extended or adjusted under 35 U.S.C. 154(b) by 0 days.

(21) Appl. No.: 16/360,632

(22) Filed: Mar. 21, 2019

(65) Prior Publication Data
US 2019/0293278 A1    Sep. 26, 2019

Related U.S. Application Data

(60) Provisional application No. 62/647,427, filed on Mar. 23, 2018.

(51) Int. Cl.
*F21V 33/00* (2006.01)
*A47C 7/72* (2006.01)
*F21Y 115/10* (2016.01)

(52) U.S. Cl.
CPC .. *F21V 33/0012* (2013.01); *A47B 2220/0075* (2013.01); *A47C 7/725* (2013.01); *F21V 33/0024* (2013.01); *F21Y 2115/10* (2016.08)

(58) Field of Classification Search
CPC ............ A47B 2220/0075; A47B 37/00; A47C 31/008; A47C 7/725; F21V 33/0012
See application file for complete search history.

(56) References Cited

U.S. PATENT DOCUMENTS

| | | | |
|---|---|---|---|
| 6,224,491 B1 * | 5/2001 | Hiromi | A63G 31/007 472/59 |
| 2006/0221599 A1 | 10/2006 | Hornsby | |
| 2007/0257530 A1 | 11/2007 | Florez | |
| 2009/0050028 A1 | 2/2009 | Fang | |
| 2014/0213359 A1 | 7/2014 | Schlossberg et al. | |
| 2017/0284618 A1 | 10/2017 | Reynolds | |
| 2017/0318975 A1 * | 11/2017 | Schwab | A47C 3/18 |

OTHER PUBLICATIONS

International Search Report and Written Opinion received in PCT/US2019/023365 dated Jun. 3, 2019, 10 pgs.

* cited by examiner

*Primary Examiner* — Joseph L Williams
*Assistant Examiner* — Jacob R Stern
(74) *Attorney, Agent, or Firm* — Moss & Barnett; Michael A. Bondi

(57) ABSTRACT

A lighted gaming furniture system including a piece of furniture, at least one light, a power source, a sensor, a controller and a gaming system. The gaming system operably linked to the controller. The at least one light is attached to the piece of furniture. The sensor is capable of receiving sound emitted by the gaming system. The controller is operably attaching the power source, the sensor and the at least one light to control illumination of the at least one light.

21 Claims, 5 Drawing Sheets

LIGHTED GAMING FURNITURE SYSTEM, LIGHTED GAMING CHAIR AND LIGHTED GAMING DESK

REFERENCE TO RELATED APPLICATION

This application claims priority to Provisional Applic. No. 62/647,427, filed on Mar. 23, 2019, the contents of which are incorporated herein by reference.

FIELD OF THE INVENTION

The invention relates to furniture that is used while playing video games. More particularly, the invention relates to lighted gaming furniture system, lighted gaming chair and lighted gaming desk.

BACKGROUND OF THE INVENTION

Video games are a popular form of entertainment. To enhance the experience associated with video games and/or to enhance the performance while playing video games, chairs have been marketed to include sound and/or vibrations. The chairs may also enhance the ability of the players to move while playing the video games. A variety of multimedia furniture is marketed by Ace Bayou Corporation, the assignee of this patent application.

SUMMARY OF THE INVENTION

An embodiment of the invention is directed to a lighted gaming furniture system that includes a gaming system, a piece of furniture, at least one light, a power source, a sensor and a controller. The at least one light is attached to the piece of furniture. The sensor is capable of receiving sound emitted by the gaming system. The controller operably attaches the power source, the sensor and the at least one light to control illumination of the at least one light. The gaming system is operably linked to the controller.

Another embodiment of the invention is directed to a method of enhancing an experience while playing a video game. A piece of furniture, at least one light and a controller are provided. The at least one light is attached to the piece of furniture. Illumination of the at least one light is controlled with the controller. A video game is played using the gaming system. The gaming system causes a sound to be emitted. The sound is received with a sensor that is operable connected to the controller. At least one of an illumination pattern and an illumination color of the at least one light is changed by the controller based upon the sound from the gaming system.

Another embodiment of the invention is directed to a lighted gaming chair that includes a seat portion, a back portion, at least one light, a power source and a controller. The back portion is operably attached to the seat portion. The at least one light is attached to at least one of the seat portion and the back portion. The controller operably attaches the power source and the at least one light to control illumination of the at least one light.

Another embodiment of the invention is directed to a lighted gaming desk that includes a desktop surface, a leg, at least one light, a power source and a controller. The leg is operably attached to the desktop surface for supporting the desktop surface in a spaced-apart relationship with respect to a ground surface. The at least one light is attached to at least one of the desktop surface and the leg. The controller operably attaches the power source and the at least one light to control illumination of the at least one light.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 2:
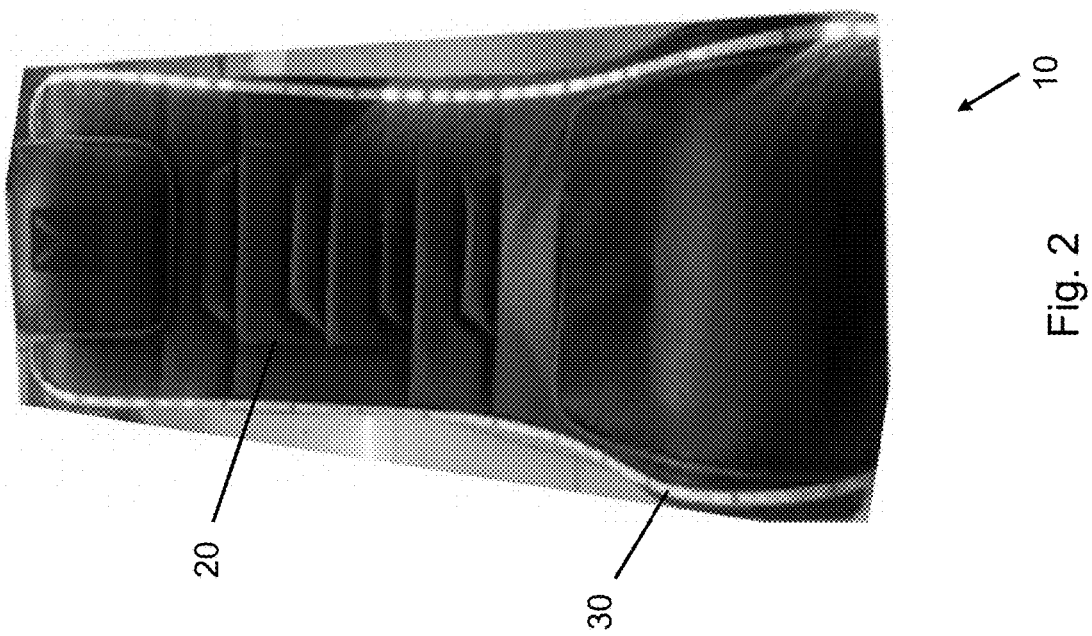
FIG. 2 is a front view of the rocker style gaming chair of FIG. 1 with the lights in a second configuration.

An embodiment of the invention is directed to rocker style gaming chairs that are intended to be used by persons who are playing video games. The rocker style gaming chairs are illustrated at 10 in FIGS. 1 and 2.

The rocker style gaming chair 10 has an arched configuration that includes a frame over which upholstery 20 is placed. A person of skill in the art will appreciate that a variety of materials may be used to fabricate the frame and the upholstery 20. The upholstery 20 may be fabricated with a variety of colors.

The configuration of the rocker style gaming chair 10 enables a person sitting on the rocker style gaming chair 10 to rock forwards and backwards while playing a video game. Such movement enhances the immersive experience while playing video games. An example of one such rocker is illustrated in U.S. Pat. No. D548,987, which is assigned to the assignee of the present application.

The rocker style gaming chair 10 includes at least one speaker it is capable of emitting sounds associated with the video game being played. In certain embodiments, the rocker style gaming chair 10 includes a plurality of speakers.

The rocker style gaming chair 10 may also include a vibration mechanism that is capable of emitting vibrations that are associated with the video game being played. An example of one such device that is capable of emitting vibrations is a subwoofer. The vibration emitting mechanism may be linked to the at least one speaker.

The rocker style gaming chair 10 further includes lights 30 positioned on a surface thereof that are capable of being selectively illuminated while the person is playing the video game while sitting on the rocker style gaming chair 10.

It is also possible for the lights 30 to be mounted below a surface of the rocker style gaming chair 10 such that illumination from the lights 30 is visible outside the rocker style gaming chair 10. It is also possible for the lights 30 to be mounted on at least one of a back surface and a lower surface of the rocker style gaming chair 10.

The lights 30 may be provided in an elongated configuration. In certain embodiments, the lights 30 are attached to the surface of the rocker style gaming chair 10 in locations so that illumination form the lights 30 is visible while the person is sitting on the rocker style gaming chair 10. The lights 30 may also be visible from the sides or back of the rocker style gaming chair 10.

The lights 30 may be positioned to extend at least partially along a side edge of the rocker style gaming chair 10 proximate the intersection of the front surface and the side surfaces. In other embodiments, the lights 30 extend substantially from an upper end of the front surface to a lower end of the front surface. The lights 30 may also extend along a top edge of the rocker style gaming chair 10 proximate the intersection of the front surface and the top surface.

The lights 30 may be attached to the rocker style gaming chair 10 using a variety of techniques. An important feature of the mechanism used to attach the lights 30 to the rocker style gaming chair 10 is that the lights 30 be protected from damage such as be contact from the person sitting on the rocker style gaming chair 10.

On technique that may be used to attach the lights 30 to the rocker style gaming chair 10 is an at least partially transparent pipping that is attached to the upholstery panels along edges thereof. In certain embodiments the pipping is fabricated from a transparent material.

The pipping may have a channel formed therein that is adapted to receive the lights 30. Placing the lights 30 in the channel thereby prevents direct contact of the lights by the person sitting on the rocker style gaming chair 10.

Figure 1:
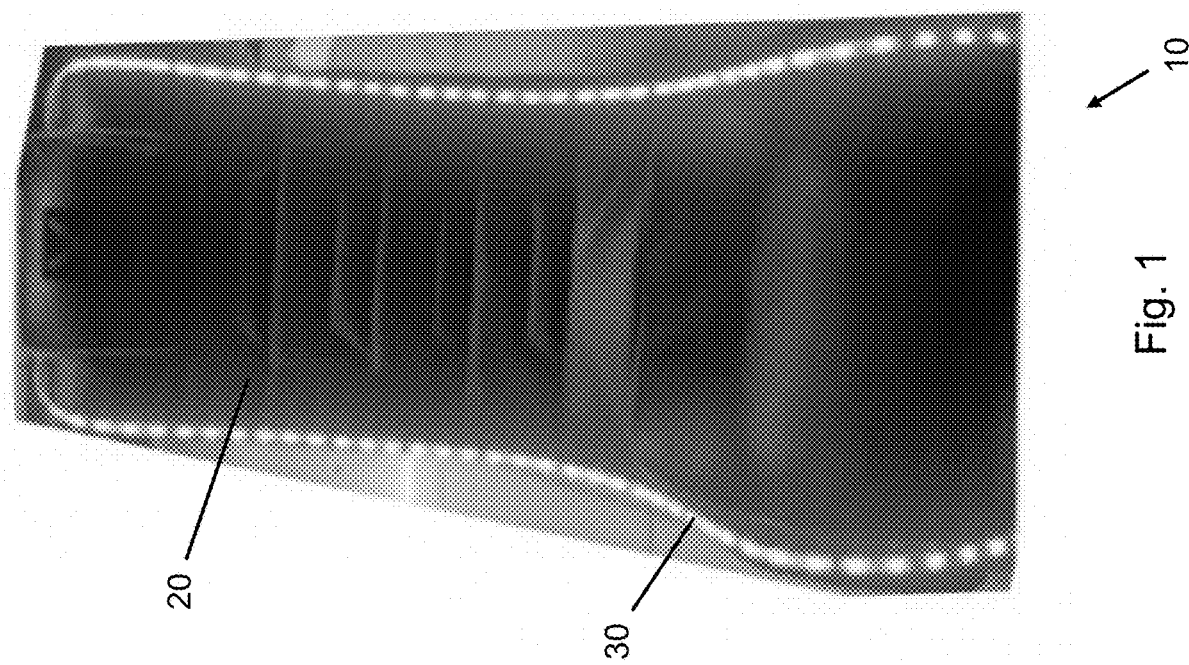
FIG. 1 is a front view of a rocker style gaming chair according to an embodiment of the invention where lights are in a first configuration.

A variety of configurations may be used for the lights 30. In one configuration, which is illustrated in FIGS. 1 and 2, the lights 30 encompass a plurality of light emitting diodes that are mounted in a spaced-apart configuration. This embodiment provides the ability to illuminate the individual light emitting diodes in a single color as illustrated in FIG. 1. This embodiment also enables certain of the light emitting diodes to be illuminated and for such illumination to be in different colors as illustrated in FIG. 2.

In another embodiment optical fibers are used and these optical fibers are illuminated using a light emitting diode or other mechanism at one end thereof. The illumination mechanism may be mounted in an interior of the rocker style gaming chair 10.

The lights 30 are connected to a power source and a controller. The controller may be linked to the video game unit and/or the computer on which the video game is being played. Using such a configuration enables the lights 30 to be illuminated to correspond with aspects of the video game. The link between the controller and the video game unit and/or the computer may be wired or wireless.

The controller may also include the ability for the person playing the video game to change colors and/or patterns at which the lights are illuminated. Such control may be directly changed on the controller, using a wireless remote or using an application on a mobile phone.

In alternative embodiments, there is not a direct link between the controller and the video game unit and/or computer on which the video game is being played. Rather, the controller has a sensor such as a microphone that receives sounds emitted from the video game.

Another embodiment of the invention is directed to office style gaming chairs that are intended to be used by persons who are playing video games. The office style gaming chairs are illustrated at 110 in FIGS. 3-5.

The office style gaming chair 110 generally includes a seat portion 120, a back portion 122 and a base portion 124. The office style gaming chair 110 may also include at least one arm 126.

The seat portion 120 and the back portion 122 may each include a frame over which upholstery 126 is placed. A person of skill in the art will appreciate that a variety of materials may be used to fabricate the frame and the upholstery 126. In particular, the upholstery 130 may be fabricated with a variety of colors.

In certain embodiments, the back portion 122 is oriented generally transverse to the seat portion 120. An orientation of the back portion 122 with respect to the seat portion 120 may be adjustable. In certain embodiments, the angle between the back portion 122 and the seat portion 120 may be between about 60 degrees and about 180 degrees.

The base portion 124 may include a plurality of wheels 128 that are mounted in a spaced-apart configuration. The wheels 128 enable the office style gaming chair 110 to be rolled to a use location and while a person is sitting on the office style gaming chair 110.

The office style gaming chair 110 includes at least one speaker it is capable of emitting sounds associated with the video game being played. In certain embodiments, the office style gaming chair 110 includes a plurality of speakers.

The office style gaming chair 110 may also include a vibration mechanism that is capable of emitting vibrations that are associated with the video game being played. An example of one such device that is capable of emitting vibrations is a subwoofer. The vibration emitting mechanism may be linked to the at least one speaker.

The office style gaming chair 110 further includes lights 130 positioned on a surface thereof that are capable of being selectively illuminated while the person is playing the video game while sitting on the office style gaming chair 110.

It is also possible for the lights 130 to be mounted below a surface of the office style gaming chair 110 such that illumination from the lights 130 is visible outside the office style gaming chair 110. It is also possible for the lights 130 to be mounted on at least one of a back surface of the back portion 122 and a lower surface of the seat portion 120.

The lights 130 may be provided in an elongated configuration. In certain embodiments, the lights 130 are attached to the surface of the office style gaming chair 110 in locations so that illumination form the lights 130 is visible while the person is sitting on the office style gaming chair 110.

The lights 130 may be positioned to extend at least partially along a side edge of the back portion 122 proximate the intersection of the front surface and the side surfaces. In other embodiments, the lights 130 extend substantially from an upper end of the front surface of the back portion 122 to a lower end of the front surface of the back portion 122. The lights 130 may also extend along a top edge of the back portion 122 proximate the intersection of the front surface and the top surface of the back portion 122. The lights 130 may also extend at least partially around a top surface of the seat portion 120 proximate an edge thereof.

The lights 130 may be attached to the office style gaming chair 110 using a variety of techniques. An important feature of the mechanism used to attach the lights 130 to the office style gaming chair 110 is that the lights 130 be protected from damage such as contact from the person sitting on the office style gaming chair 110.

On technique that may be used to attach the lights 130 to the office style gaming chair 110 is an at least partially transparent pipping that is attached to the upholstery panels along edges thereof. In certain embodiments the pipping is fabricated from a transparent material.

The pipping may have a channel formed therein that is adapted to receive the lights 130. Placing the lights 130 in the channel thereby prevents direct contact of the lights by the person sitting on the office style gaming chair 110.

Figure 4:
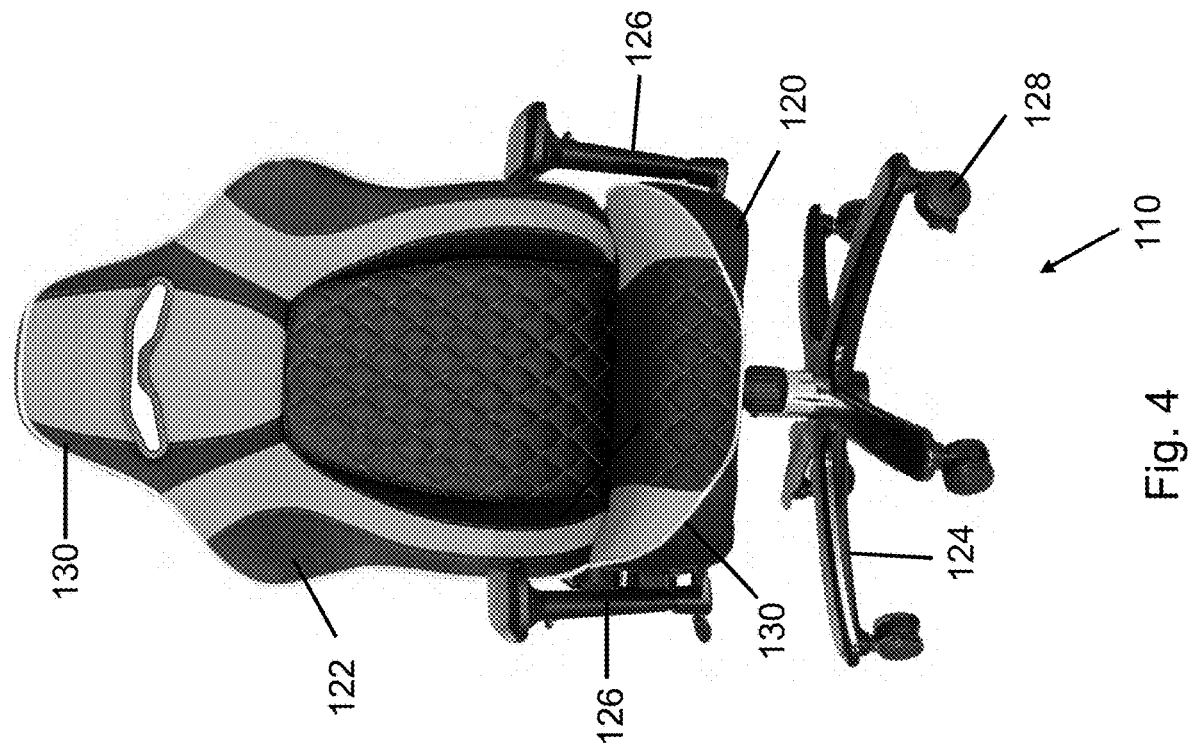
FIG. 4 is a front view of the office style gaming chair of FIG. 3.
Figure 3:
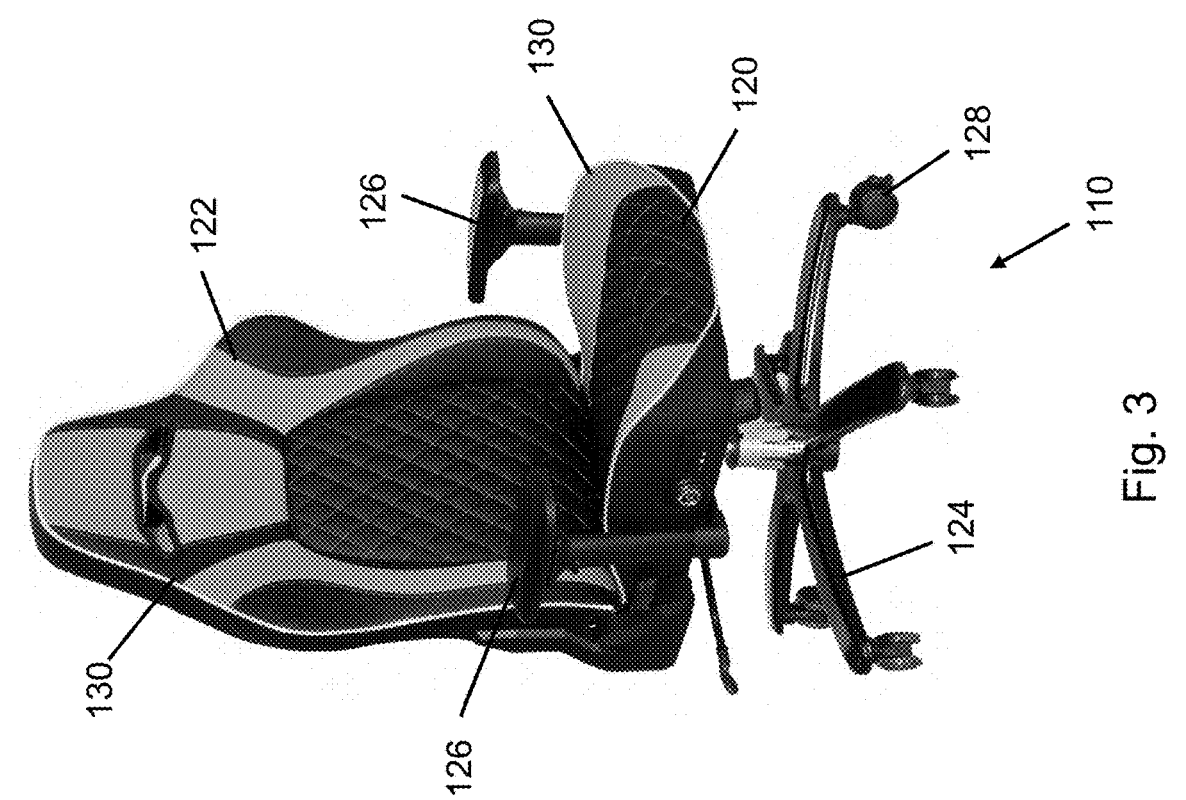
FIG. 3 is a perspective view of office style gaming chair according to another embodiment of the invention.
Figure 6:
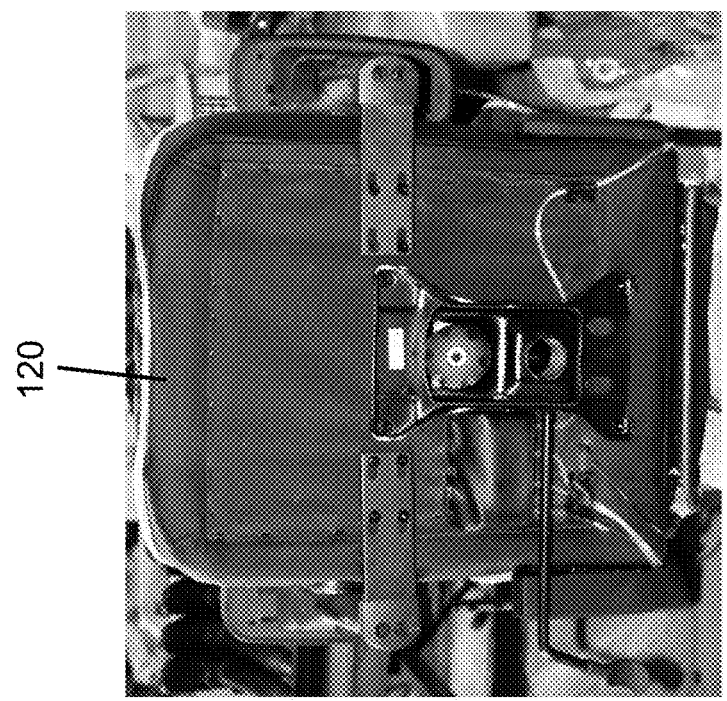
FIG. 6 is a lower view of a seat portion of the office style gaming chair of FIG. 3.
Figure 5:
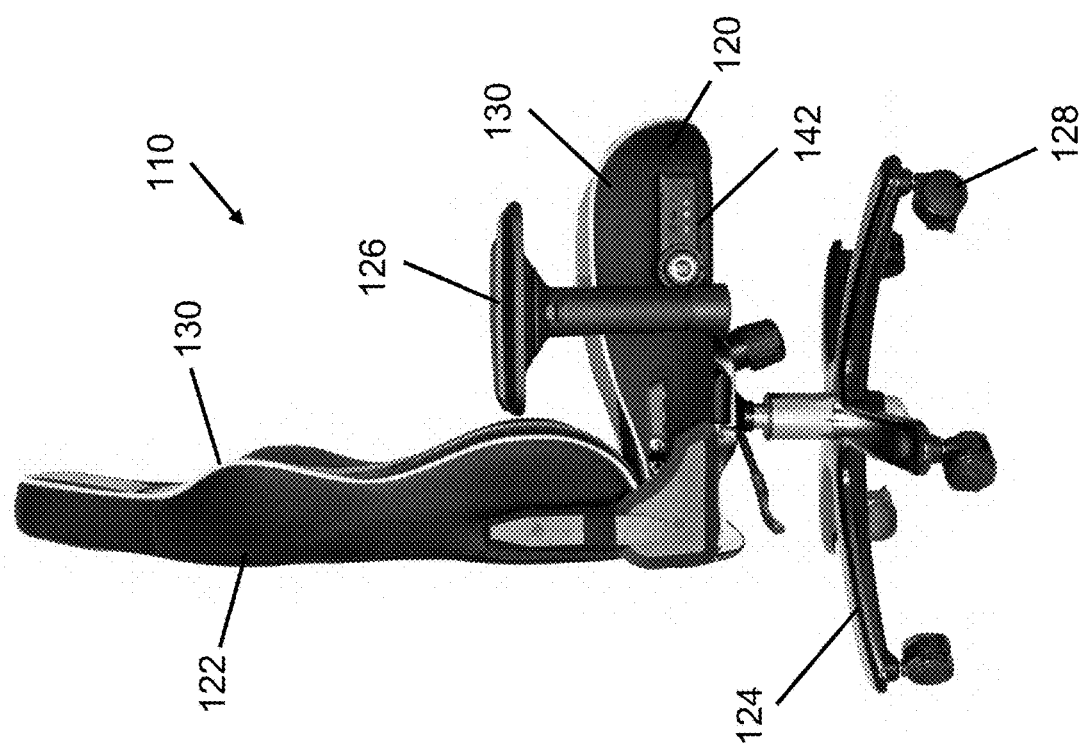
FIG. 5 is a side view of the office style gaming chair of FIG. 3.
Figure 7:
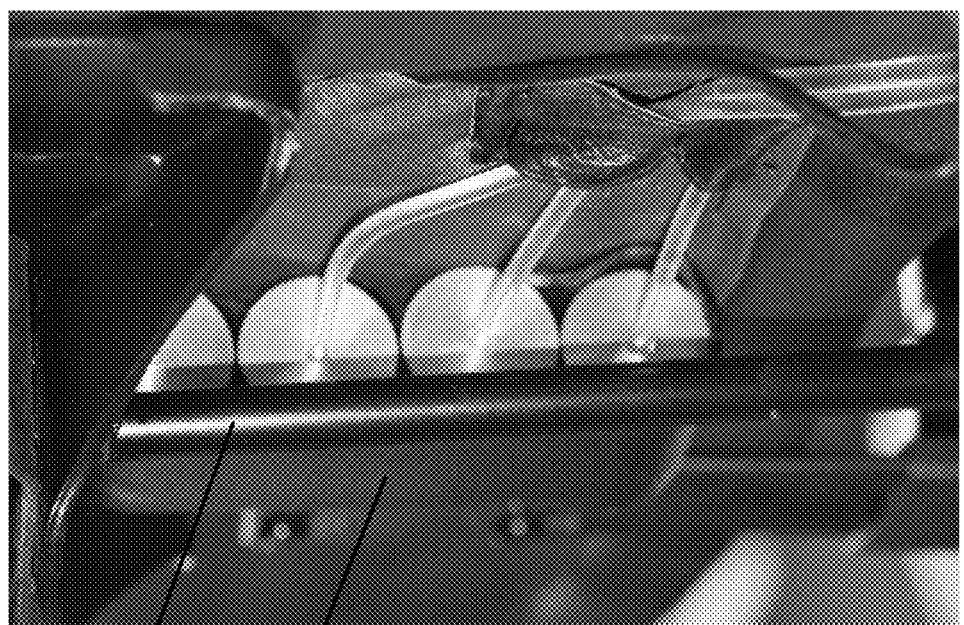
FIG. 7 is an enlarged lower view of the section portion of the office style gaming chair of FIG. 3.

A variety of configurations may be used for the lights 130. In one configuration, which is illustrated in FIGS. 3-5, the lights 130 encompass optical fibers that are illuminated using an illumination mechanism 140 such as a light emitting diode or other mechanism at one end thereof. The illumination mechanism 140 may be mounted on a lower surface of the seat portion 120 as illustrated in FIGS. 6 and 7.

Figure 8:
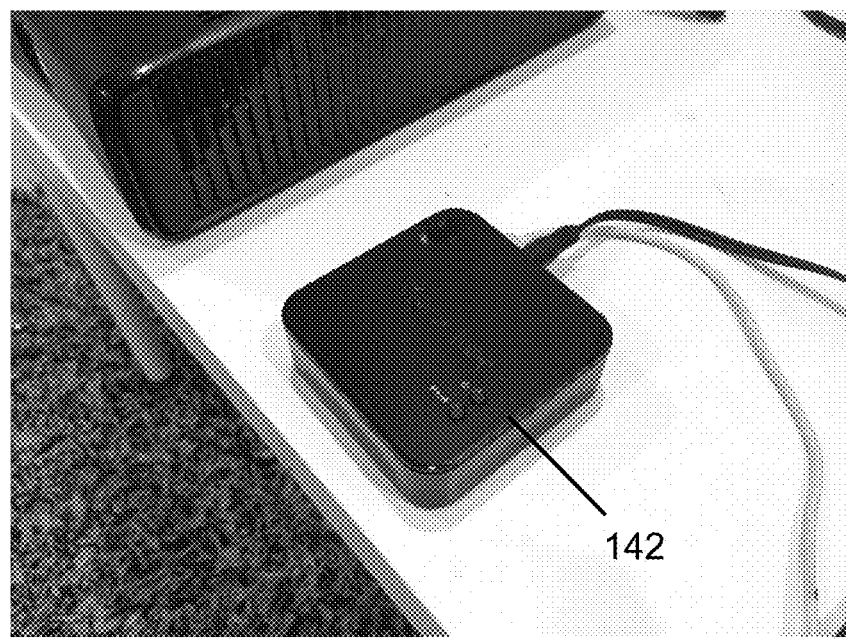
FIG. 8 is a perspective view of a controller for use in conjunction with any of the embodiment of the multimedia furniture.

Using a manner that is similar to the manner described with respect to the preceding embodiment of the invention, the lights 130 are connected to a power source and a controller 142, which is illustrated in FIG. 8. The controller 142 may be linked to the video game unit and/or the computer on which the video game is being played. Using such a configuration enables the lights 130 to be illuminated to correspond with aspects of the video game. The link between the controller 142 and the video game unit and/or the computer may be wired or wireless.

The controller 142 may also include the ability for the person playing the video game to change colors and/or patterns at which the lights are illuminated. Such control may be directly changed on the object or may be remotely controlled on a wireless remote or using an application on a mobile phone.

In alternative embodiments, there is not a direct link between the controller and the video game unit and/or computer on which the video game is being played. Rather, the controller has a sensor such as a microphone that receives sounds emitted from the video game.

Yet another embodiment of the invention is directed to a desk or table that is intended to be used by persons who are playing video games. The gaming desk is illustrated at 210 in FIGS. 9 and 10.

Figure 9:
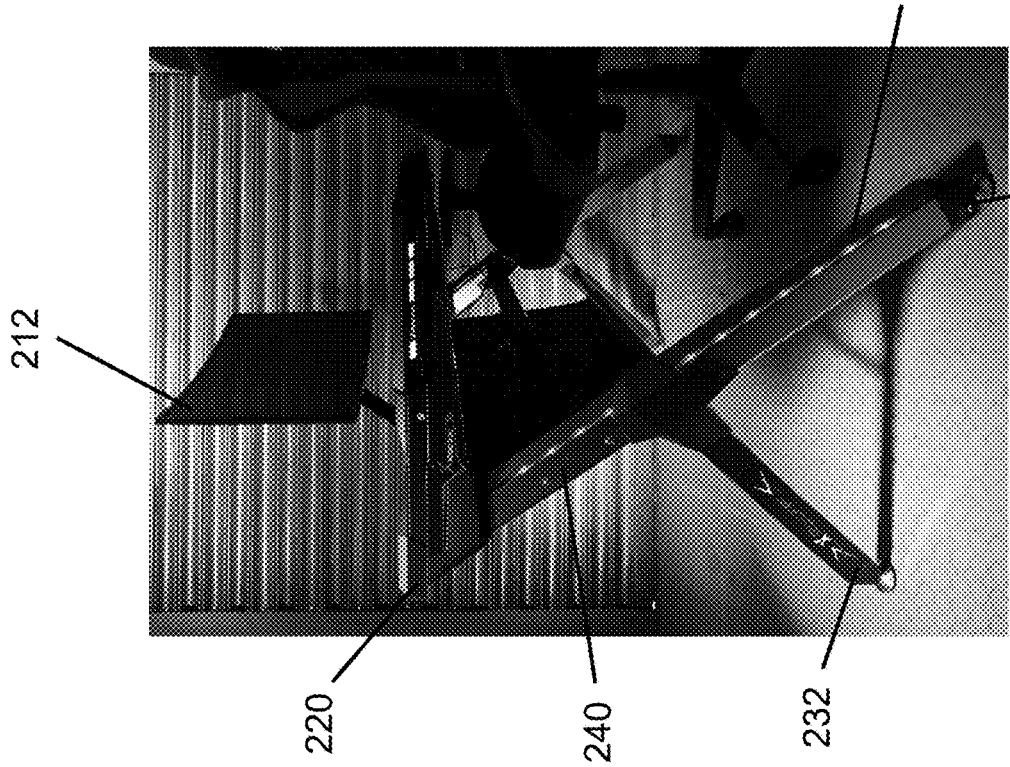
FIG. 9 is a side view of a gaming desk according to another embodiment of the invention.

The gaming desk 210 may be used when playing video games using a computer and an associated monitor 212 such as illustrated in FIG. 9. The gaming desk 210 generally includes an upper surface 220 and at least one support leg 222.

In certain embodiments, the upper surface 220 has a generally rectangular configuration. A width and a depth of the upper surface 220 may be selected based upon a variety of factors such as the size of the components such as the monitor 212 that is desired to be placed on the gaming desk 210.

In certain embodiments, there is one support leg 222 attached to opposite sides of the upper surface 220. The support leg 222 may include two leg sections 230, 232. The first leg section 230 may have a generally linear configuration and be oriented to extend from a back corner of the upper surface 220 where the first leg section 230 attaches to the upper surface 220. A lower end of the first leg section 230 that is placed on the ground or floor may be generally aligned with a front edge of the upper surface 220. The first leg section 230 is thereby oriented at an acute angle with respect to the upper surface 220.

The second leg section 232 extends from an intermediate location on the first leg section 230. In certain embodiments, the second leg section 232 intersects the first leg section 230 at an intermediate location thereof. The second leg section 232 may be oriented at an acute angle with respect to the first leg section 230. A lower end of the second leg section 232 that is placed on the ground or floor may be generally aligned with a back edge of the upper surface 220.

The at least one support leg 222 may be removably attached to the upper surface 220 to facilitate packaging the gaming desk 210 in a relatively dense configuration. A person of skill in the art will appreciate that there are a variety of techniques for attaching the at least one support leg 222 to the upper surface 220.

When the upper surface 220 is attached to the at least one support leg 222, the upper surface 220 may be generally horizontally oriented. In other embodiments, it is possible to change the orientation of the upper surface 220.

Figure 10:
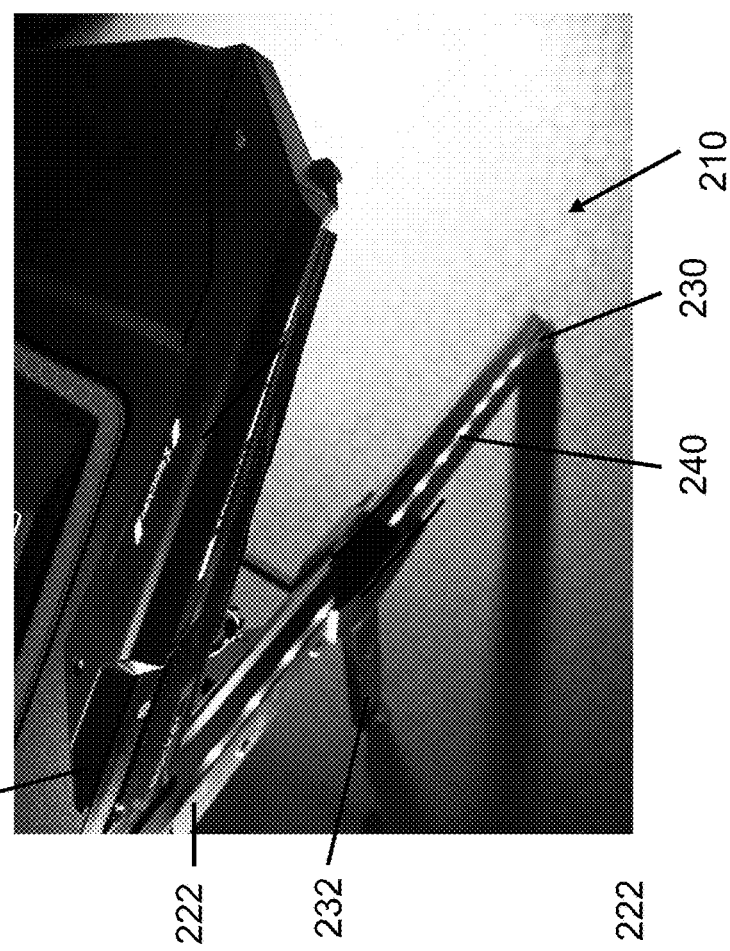
FIG. 10 is a downward view of a side of the gaming desk.

As illustrated in FIGS. 9 and 10, at least part of the support leg 222 has lights 240. In certain embodiments, the lights 240 extend substantially from the lower end of the first leg section 230 to the upper end of the first leg section 230.

The lights 240 are positioned on the support leg 222 so that a person sitting at the gaming desk 210 can see the lights illuminate. In certain embodiments, the lights 240 are visible on an edge of the support leg 222 that is directed towards the front of the gaming desk 210. In other embodiments, the lights 240 are also visible from each of the sides of the support leg 222.

The lights may also be positioned on the upper surface 220. In certain embodiments, the lights are proximate an edge of the upper surface 220. In other embodiments, the lights are positioned along each of the edges of the upper surface 220.

Using a manner that is similar to the manner described with respect to the other embodiments of the invention, the lights are connected to a power source and a controller. The controller may be linked to the video game unit and/or the computer on which the video game is being played. Using such a configuration enables the lights to be illuminated to correspond with aspects of the video game. The link between the controller and the video game unit and/or the computer may be wired or wireless.

The controller may also include the ability for the person playing the video game to change colors and/or patterns at which the lights are illuminated. Such control may be directly changed on the object or may be remotely controlled on a wireless remote or using an application on a mobile phone.

In alternative embodiments, there is not a direct link between the controller and the video game unit and/or computer on which the video game is being played. Rather, the controller has a sensor such as a microphone that receives sounds emitted from the video game.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A lighted gaming furniture system comprising:
   a gaming system;
   a piece of furniture;
   at least one light attached to the piece of furniture;
   a cover that substantially extends over the at least one light, wherein the cover comprises piping having a channel formed therein, wherein the at least one light is positioned in the channel and wherein the piping attaches the at least one light to the piece of furniture;
   a power source;
   a sensor that is capable of receiving sound emitted by a gaming system; and
   a controller operably attaching the power source, the sensor and the at least one light to control illumination of the at least one light, wherein the gaming system is operably linked to the controller.

2. The lighted gaming furniture system of claim 1, wherein the piece of furniture comprises a desk, wherein the desk comprises a desktop surface and a leg that extends from the desktop surface and wherein the at least one light is attached to at least one of the desktop surface and the leg.

3. The lighted gaming furniture system of claim 1, wherein the piece of furniture comprises a chair and wherein the chair comprises a front surface and an edge surface that extends substantially around the front surface and wherein the at least one light is attached to the chair proximate the intersection of the front surface and the edge surface.

4. The lighted gaming furniture system of claim 1, wherein the at least one light comprises at least one of light emitting diodes and optical fibers and wherein the at least one light is recessed below an outer surface of the piece of furniture.

5. The lighted gaming furniture system of claim 1, wherein the piece of furniture comprises at least one of a speaker and a vibration mechanism.

6. The lighted gaming furniture system of claim 1, wherein at least one of an illumination pattern and an illumination color of the at least one light is changed by the controller based upon output from the gaming system.

7. A method of enhancing an experience while playing a video game comprising:
   providing a piece of furniture, at least one light and a controller, wherein the piece of furniture comprises a desk, wherein the desk comprises a desktop surface and a leg that extends from the desktop surface, wherein the at least one light is attached to at least one of the desktop surface and the leg;
   controlling illumination of the at least one light with the controller;
   playing the video game using the gaming system, wherein the gaming system causes a sound to be emitted;
   receiving the sound with a sensor that is operable connected to the controller; and
   changing at least one of an illumination pattern and an illumination color of the at least one light is changed by the controller based upon the sound from the gaming system.

8. The method of claim 7, wherein the at least one light is positioned on the piece of furniture so that a person using the furniture can see light emitted from the at least one light while using the piece of furniture.

9. The method of claim 7, wherein the piece of furniture comprises a chair and wherein the chair comprises a front surface and an edge surface that extends substantially around the front surface and wherein the at least one light is attached to the chair proximate the intersection of the front surface and the edge surface.

10. The method of claim 7, wherein the at least one light comprises at least one of light emitting diodes and optical fibers and wherein the at least one light is recessed below an outer surface of the piece of furniture.

11. The method of claim 7, and further comprising:
    emitting a sound from a speaker that is operably connected to the controller; and
    emitting a vibration from a vibration mechanism that is operably connected to the controller.

12. The method of claim 7, and further comprising a cover that substantially extends over the at least one light and wherein the cover comprises piping having a channel formed therein, wherein the at least one light is positioned in the channel and wherein the piping attaches the at least one light to the piece of furniture.

13. A lighted gaming chair comprising:
    a seat portion;
    a back portion operably attached to the seat portion, wherein the seat portion and the back portion each comprise an edge that extend around the seat portion and the back portion;
    at least one light attached to at least one of the seat portion and the back portion, wherein the at least one light is attached to the seat portion and the back portion proximate the edge and wherein the at least one light extends substantially around the edge;
    a power source; and
    a controller operably attaching the power source and the at least one light to control illumination of the at least one light.

14. The lighted gaming chair of claim 13, wherein the at least one light comprises at least one of light emitting diodes and optical fibers.

15. The lighted gaming chair of claim 13 and further comprising a sensor that is capable of receiving sound emitted by a gaming system, wherein the gaming chair further comprises at least one of a speaker and a vibration mechanism.

16. The lighted gaming chair of claim 13, and further comprising a cover that at least partially extends over the at least one light.

17. The lighted gaming chair of claim 16, wherein the cover comprises piping having a channel formed therein, wherein the at least one light is positioned in the channel and wherein the piping attaches the at least one light to the piece of furniture.

18. A lighted gaming desk comprising:
    a desktop surface;
    a leg operably attached to the desktop surface for supporting the desktop surface in a spaced-apart relationship with respect to a ground surface;
    at least one light attached to at least one of the desktop surface and the leg;

a power source;

a sensor that is capable of receiving sound emitted by a gaming system;

at least one of a speaker and a vibration mechanism; and a controller operably attaching the power source, the at least one light to control illumination of the at least one light, the sensor and the at least one of the speaker and the vibration mechanism.

19. The lighted gaming desk of claim 18, wherein the desktop surface comprises an edge that extend around the desktop surface, wherein the at least one light is attached to the desktop surface proximate the edge and wherein the at least one light extends substantially around the edge.

20. The lighted gaming desk of claim 18, wherein the at least one light comprises at least one of light emitting diodes and optical fibers.

21. The lighted gaming desk of claim 18, and further comprising a cover that at least partially extends over the at least one light.

* * * * *